United States Patent [19]
Fryer

[11] Patent Number: 5,260,502
[45] Date of Patent: Nov. 9, 1993

[54] STABILIZATION OF PETROLEUM CONTAMINATED SOIL WITH LIME IN UNDERGROUND STORAGE TANK APPLICATIONS

[76] Inventor: David T. Fryer, P.O. Box 7035, Wyomissing, Pa. 19610

[21] Appl. No.: 818,605

[22] Filed: Jan. 9, 1992

[51] Int. Cl.$^5$ .................. E02D 29/00; B65G 5/00
[52] U.S. Cl. ..................... 588/252; 405/57; 405/128; 405/266; 106/794; 210/751
[58] Field of Search ........ 405/263, 266, 128, 53, 405/57, 58, 55, 267, 268; 106/793, 794; 210/747, 751; 588/252, 257

[56] References Cited

U.S. PATENT DOCUMENTS

| | | | |
|---|---|---|---|
| 4,028,130 | 6/1977 | Webster et al. | 210/751 X |
| 4,149,968 | 4/1979 | Kupiec et al. | 405/128 X |
| 4,375,930 | 3/1983 | Valiga | 405/267 X |
| 4,432,666 | 2/1984 | Frey et al. | 210/751 X |
| 4,687,373 | 8/1987 | Falk et al. | 210/751 X |
| 4,913,586 | 4/1990 | Gabbita | 210/751 X |
| 4,934,866 | 6/1990 | Gage | 405/55 X |
| 5,013,185 | 5/1991 | Taki | 405/128 |
| 5,098,224 | 3/1992 | Netzel et al. | 405/267 X |

FOREIGN PATENT DOCUMENTS 3014491  1/1991  Japan ..................... 405/57

Primary Examiner—David H. Corbin
Assistant Examiner—Arlen L. Olsen

[57] ABSTRACT

Hydrocarbon contaminated soil from the excavation of a leaking underground storage tank is physically and chemically stabilized by combining the soil with a lime substance which is hydrated to form a flowable mixture. This mixture can then be used to fill the excavation and, if applicable, can be flowed around a replaced storage tank creating a low permeable liner. This monolithic mass prohibits hydrocarbons and heavy metals in the soil from leaching into the vicinity groundwater and prohibits leaking from possible future tank ruptures.

6 Claims, 1 Drawing Sheet

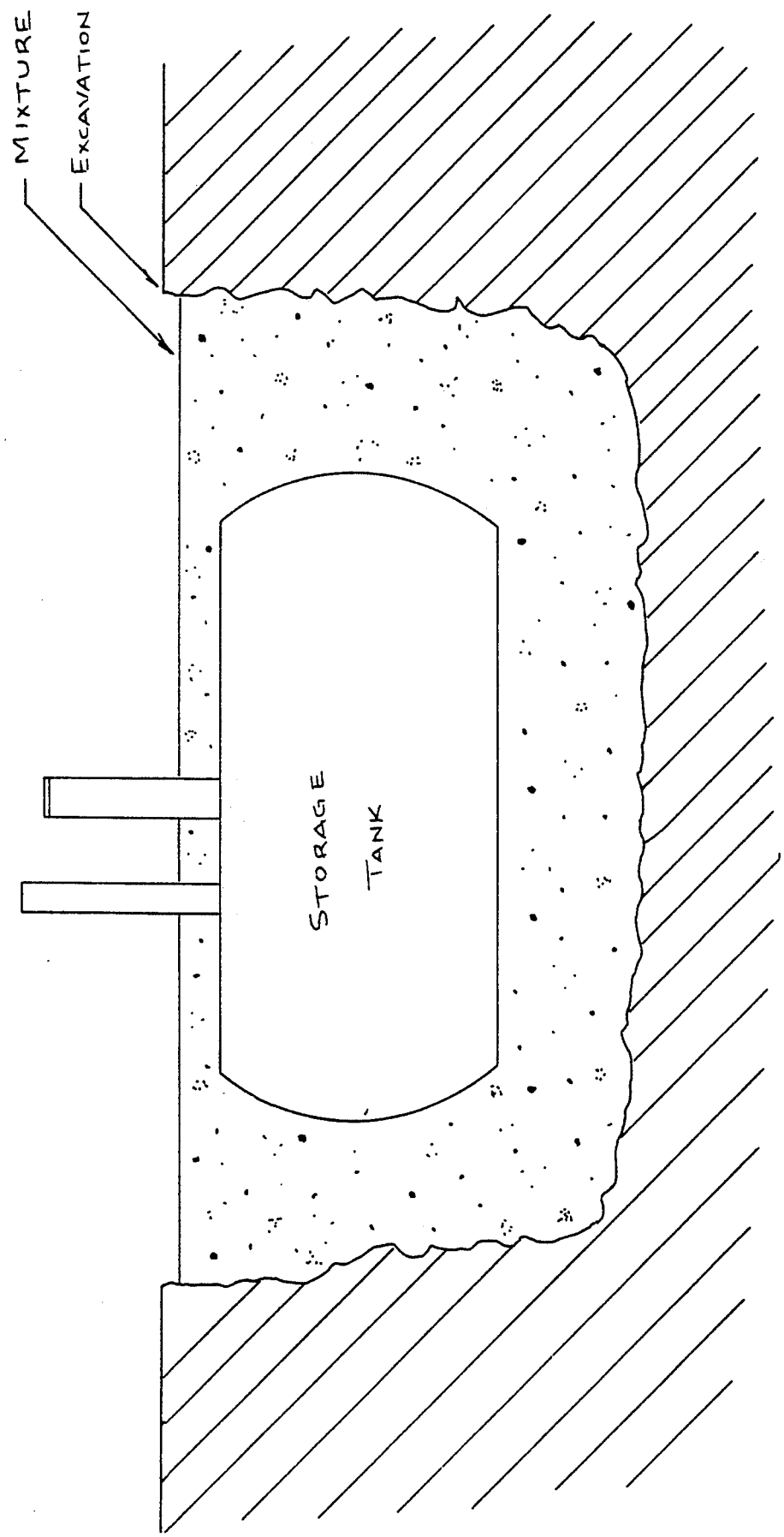

STABILIZATION OF PETROLEUM CONTAMINATED SOIL WITH LIME IN UNDERGROUND STORAGE TANK APPLICATIONS

BACKGROUND OF THE INVENTION

1. The Field of the Invention

This invention relates in general to contaminated soil remediation and in particular to hydrocarbon contaminated soil remediation from underground storage tanks applications.

2. The Description of Related Art

There are approximately 3 million underground storage tanks in the United States, most of which are used to contain petroleum products. Many of these have been or will be leaking, contaminating the soil and leaching into the groundwater. In order to comply with USEPA act 40 CFR-280 these tanks must be removed and all contaminated soil treated.

Traditional methods of treatment include incineration, landfilling, or biological remediation. Incineration consists of using heat to burn off the hydrocarbons and either replacing the soil in the excavation, landfilling it, or using it under road surfaces or in asphalt. This method sterilizes the soil destroying all beneficial microbes and also leaves behind an ash residue and heavy metals which must be landfilled. Due to the decreasing availabilities of landfill space and the need to reserve space for materials which cannot as yet be recycled, the landfill option of disposal is becoming increasingly unpopular and costly for items such as petroleum contaminated soil. Bioremediation of hydrocarbon contaminated soils takes a long time to accomplish, takes up much space and still doesn't address the problem of heavy metal contamination such as lead from leaded gasolines.

Other methods of treating petroleum contaminated soil have been along the lines of mixing into hot mix asphalt or as an aggregate in a high strength concrete. Either method prohibits leaching of contaminates into the groundwater, but neither involves on site remediation which is a safer and preferred method of treatment.

SUMMARY OF THE INVENTION

The process of lime stabilization of hydrocarbon contaminated soil comprises combining the contaminated soil from an underground storage tank excavation with a substance containing free lime which can be hydrated creating a monolithic mass. This flowable mixture can then be poured into the excavation and, if applicable, around a replaced storage tank forming a liner of low permeability to prohibit leaching and low compressive strength to enable reexcavation, if necessary. The hydration of the lime physically binds the hydrocarbons and toxic heavy metals to the soil through fixation and encapsulation. The high pH of the lime also bonds the hydrocarbons and heavy metals chemically to prohibit leaching into the groundwater. This process can be done on site, reserving landfill space and saving outside clean fill for other needed applications.

BRIEF DESCRIPTION OF THE DRAWING

The sole drawing FIGURE is a side view of an underground storage tank showing the lime stabilized soil used as a backfill around the tank inside the excavation.

DESCRIPTION OF THE PREFERRED EMBODIMENT

The preferred embodiment of the process of lime stabilization of hydrocarbon contaminated soil should result in a mixture of such consistency that it can form a tight liner of monolithic mass between a replaced storage tank and the excavation which will not leach into the groundwater in the vicinity as shown in FIGURE.

The hydrocarbon contaminated soil will comprise such contaminates as fuel oil, diesel fuel, gasoline, alcohols or solvents. All contaminated soils should be excavated and handled in conformance with all EPA regulations. Standing hydrocarbon liquids should be pumped out and recycled by different processes not covered in this invention. The contaminated soil should be of a consistency not greater than 3 inches in size. Larger stones should be screened and, if desired, crushed to size. These can be handled and treated separately.

The lime substances used should contain adequate free lime that, when hydrated, will bond with the soil to form a homogeneous, monolithic mass. Typical substances available will comprise lime, quicklime, lime kiln dust, cement, cement kiln dust, flyash, or fluidized bed ash. The ratio used should be adequate to mix homogeneously and should form a mass of uncompressed strength of at least 20 pounds per square inch and less than 1,000 pounds per square inch in five days. Adequate water should be added to create a flowable consistency without weakening the strength. The water used should be potable and free of contaminants. Hydration temperature should not exceed 70 degrees Celsius so as not to stop the natural bioremediation process. Laboratory tests of small batches of samples should be performed to determine mixture ratios prior to field applications.

The blender used to mix the materials should be capable of accurately metering the materials to correct proportions and adequately mixing the materials to a homogeneous consistency. It should be capable of mixing on site and be able to discharge the mixture into the excavation and around a storage tank.

The process of lime stabilization involves metering the contaminated soil and the lime substance in proper proportions with water into a mixing auger or chamber. When mixed to adequate homogeneity the mixture is discharged into the excavation and, if applicable, to form a bottom liner for the storage tank. After the tank is set into position the mixture is flowed around the tank to fill the excavation to the desired level.

It is believed that this process of lime stabilization of hydrocarbon contaminated soil when used in underground storage tank applications is an improved method of treating contaminated soil on site while prohibiting hydrocarbons and heavy metals from leaching into the vicinity groundwater both from the soils or from possible future tank leakage. The hydration of the lime causes a cementitious bond to occur in the mixture, physically fixating the hydrocarbons and toxic heavy metals to the soil particles and permanently encapsulating them into a monolithic mass. The high pH of the lime chemically bonds the hydrocarbons and toxic heavy metals into insoluble hydroxides. Also, the mixture's low permeability prohibits leaching and leaks while its low compressive strength allows reexcavation, if necessary.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description but rather by the claims appended hereto.

What is claimed is:

1. A method for stabilization of petroleum contaminated soil surrounding an underground storage tank comprising:

providing a site having an underground storage tank surrounded by contaminated soil;

removing said storage tank from the ground;

mixing the contaminated soil with a cementitious binder to fix and encapsulate the contaminated soil and;

placing a replacement storage tank into said underground site such that the contaminated soil and the cementitious binder surround the replacement storage tank.

2. A method as in claim 1 wherein the cementitious binder is lime kiln dust and water.

3. A method as in claim 1 further comprising the step of:

removing the contaminated soil from the ground prior to mixing the contaminated soil with cementitious binder.

4. A method as in claim 3 wherein the cementitious binder is lime kiln dust and water.

5. A method as in claim 3 further comprising the step of:

separating large particles from the contaminated soil.

6. A method as in claim 1 further comprising the step of:

pumping standing hydrocarbon liquids from said site.

* * * * *